United States Patent [19]

Bentley et al.

[11] Patent Number: 5,474,324

[45] Date of Patent: Dec. 12, 1995

[54] TETHERED COVER AIRBAG SYSTEM

[75] Inventors: F. Michael Bentley, Layton, Utah; Denis J. Tostain, Cergy Le Haut, France

[73] Assignees: Morton International, Chicago, Ill.; Allibert Industrie, Meru Cedex, France

[21] Appl. No.: 311,220

[22] Filed: Nov. 7, 1994

[51] Int. Cl.$^6$ ........................................... B60R 21/16
[52] U.S. Cl. .................................. 280/728.3; 280/732
[58] Field of Search ........................ 280/728 R, 728 A, 280/728 B, 732, 728.1, 728.2, 728.3

[56] References Cited

U.S. PATENT DOCUMENTS

| | | | |
|---|---|---|---|
| 4,911,471 | 3/1990 | Hirabayashi | 280/732 |
| 5,195,776 | 3/1993 | Sakakida et al. | 280/732 |
| 5,374,078 | 12/1994 | Amamori et al. | 280/728 B |
| 5,385,366 | 1/1995 | Frank et al. | 280/728 B |

Primary Examiner—Margaret A. Focarino
Assistant Examiner—Paul N. Dickson
Attorney, Agent, or Firm—Mason, Kolehmainen, Rathburn & Wyss

[57] ABSTRACT

An airbag system for motor vehicles and the like includes an inflatable airbag contained in a housing having a protective cover normally closing a panel opening aligned with an open end of the airbag housing. The cover is bodily movable away from the opening during deployment of the airbag and a flexible tether is interconnected between the cover and the panel or the housing for limiting the travel of the cover away from the panel opening during deployment. The cover includes an integral outer skin and inner skin folded over and spaced therefrom having slots to permit passage of tethers into a space formed between the skins and eventually filled with foam. An anchor in the form of an elongated element is placed between the skins and the tether and is secured to the anchor for spreading the load exerted by the tether over a wide area of the cover to prevent fracturing or breakage thereof. After the anchor and tether are in place, the inner and outer skins are secured together along an edge in a heat staking operation.

22 Claims, 5 Drawing Sheets

TETHERED COVER AIRBAG SYSTEM

BACKGROUND OF THE INVENTION

1. Field of the Invention

The present invention relates to a tethered cover for an airbag system and more particularly to a tethered cover which is bodily movable away from a panel opening upon airbag deployment and which is positively retained by the tether so that injury from the cover to occupants or damage to parts of the vehicle does not occur in an emergency airbag deployment. The cover is especially designed to include an integral outer skin and inner skin folded along one edge and heat staked together. One or more slots is formed in the inner skin to permit passage of flexible tethers into a foam filled space formed between the inner and outer skins. An anchor is mounted in the space between the skins to secure the tethers to the cover and spread the load exerted by the tethers over a wide area of the cover so that the cover is positively retained in a tethered condition and fragmentation or breakage of the cover is not likely to take place during airbag deployment.

2. Background of the Prior Art

U.S. Pat. No. 3,822,894 to Muller et al. discloses a steering wheel having a built-in air cushion employing a strong hinge between a cover and a dish containing the airbag so that on inflation, the cover is pushed away but not completely liberated from attachment to the steering wheel.

The Wulf et al., U.S. Pat. No. 3,944,250, discloses an automatically inflatable gas cushion for the protection of passengers in vehicles employing a cover which is opened upon inflation of the airbag or gas cushion and which is retained by a flexible band so that the cover is restrained after opening.

The DiSalvo et al., U.S. Pat. No. 4,893,833, discloses a closure for an airbag deployment opening wherein an integral aluminum hinge flange on the closure is bolted to the frame of the vehicle permitting pivotal opening movement of the closure.

The Hirabayashi, U.S. Pat. No. 4,911,471, discloses an arrangement of an airbag device in a motor vehicle wherein angular pivotal movement of a door over the airbag is restricted by a strap to limit the angular degree of opening when the airbag is inflated.

U.S. Pat. No. 4,964,653 to Parker discloses a self-skinned foam closure element for an inflatable restraint door assembly having a combination hinge and tether for restraining travel of the closure element during airbag deployment.

U.S. Pat. No. 5,064,217 to Shiracki discloses a cover for an airbag unit having "Nylon" yarn bands molded in place and wrapped around a retaining band of resin provided on the airbag enclosure or housing.

U.S. Pat. No. 5,150,919 to Sakakida et al. discloses an airbag system for a vehicle having a pair of doors or lids which pivotally open in opposite direction and which are restrained by belt members so that the lids pivot about transverse axes and open smoothly upon airbag deployment.

U.S. Pat. No. 5,195,776 to Sakakida et al. discloses an airbag installation having curved airbag cover lids which are reliably opened by rotation about a center point so as not to restrict the inflation of the airbag.

U.S. Pat. No. 5,072,967 to Batchelder et al. discloses an instrument panel having an invisible airbag deployment door with weakened sections formed therein but hidden from view for facilitating fracture of the door along predetermined lines for opening movement during airbag deployment.

The Combs et al., U.S. Pat. No. 5,096,221, discloses an airbag door having plural substrates on the inside which normally retain the door in a closed position and at least one of which is notched or provided with a hidden tear seam to facilitate fracture for opening of the door.

The Catron et al., U.S. Pat. No. 5,211,421, discloses an airbag cover door retainer having bifurcated engagement flanges on the door normally retaining the door in a closed position and releasable to permit door opening during airbag deployment.

The Fujiwara et al., U.S. Pat. No. 5,199,739, discloses an airbag cover opening mechanism for a motor vehicle including a sheer pin which is severed upon opening pressure exerted on the inside of the door by the deploying airbag.

The Wang, U.S. Pat. No. 5,219,177, discloses a releasable latch for an airbag deployment door which is activated by airbag deployment to permit the door to open.

U.S. Pat. No. to Faigle et al. 5,242,191, discloses a tethered airbag cover system wherein the cover is retained after opening attached to the airbag itself.

European Patent Application No. EPO 0415 362 A2 discloses an airbag supporting system having two fly-away covers restrained by loose flexible straps.

German Patent No. DE 38 43 686 A1 discloses an airbag cover for a car which is retained in one piece in relation to the dashboard of the automobile by a retaining hinge element.

OBJECTS OF THE INVENTION

It is an object of the present invention to provide a new and improved tethered cover for an airbag system in motor vehicles and the like and more particularly to provide a tethered cover system which positively retains the cover after opening upon airbag deployment.

It is another object of the present invention to provide a new and improved airbag cover wherein integral inner and outer skins of the cover are spaced apart and an anchoring element is mounted between the skins with a tether element looped around the element to spread the load exerted by the tether over a substantial area of the cover so that fracturing and/or separation of the cover from the tether does not occur.

Still another object of the present invention is to provide a new and improved airbag system having a cover in which inner and outer skins are formed in one molded piece, which piece is subsequently folded over and subjected to a heat staking operation for securing the inner skin in place after a tether and anchor element have been installed between the inner and outer skins.

BRIEF SUMMARY OF THE PRESENT INVENTION

The foregoing objects and advantages of the present invention are accomplished in a new and improved tether and cover combination for an airbag system which includes a cover for normally closing a panel opening in the vehicle adjacent the open end of a housing containing the airbag. A flexible tether is connected between the cover and the panel or housing of the airbag system for limiting the amount of travel of the cover away from the panel opening upon inflation or deployment of the airbag. The cover includes an integral inner and outer skin formed of molded plastic material and folded over along one edge and heat staked together along an opposite edge to provide an open space therebetween for accommodating an elongated anchor. End portions of the tethers are wrapped around the anchor so that the load exerted from the tethers on the cover is spread over a substantial area of the cover to reduce the stress. The space formed between the inner and outer cover skins is filled with foam. The anchor maintains the cover in a positively tethered condition before, during and after airbag deployment and by reducing the stress exerted from the tether to the cover during airbag deployment, the tendency of the cover to fracture into several pieces is minimized.

BRIEF DESCRIPTION OF THE DRAWINGS

For a better understanding of the present invention, reference should be had to the following detailed description taken in conjunction with the drawings, in which.

DETAILED DESCRIPTION OF A PREFERRED EMBODIMENT OF THE INVENTION

Figure 1:
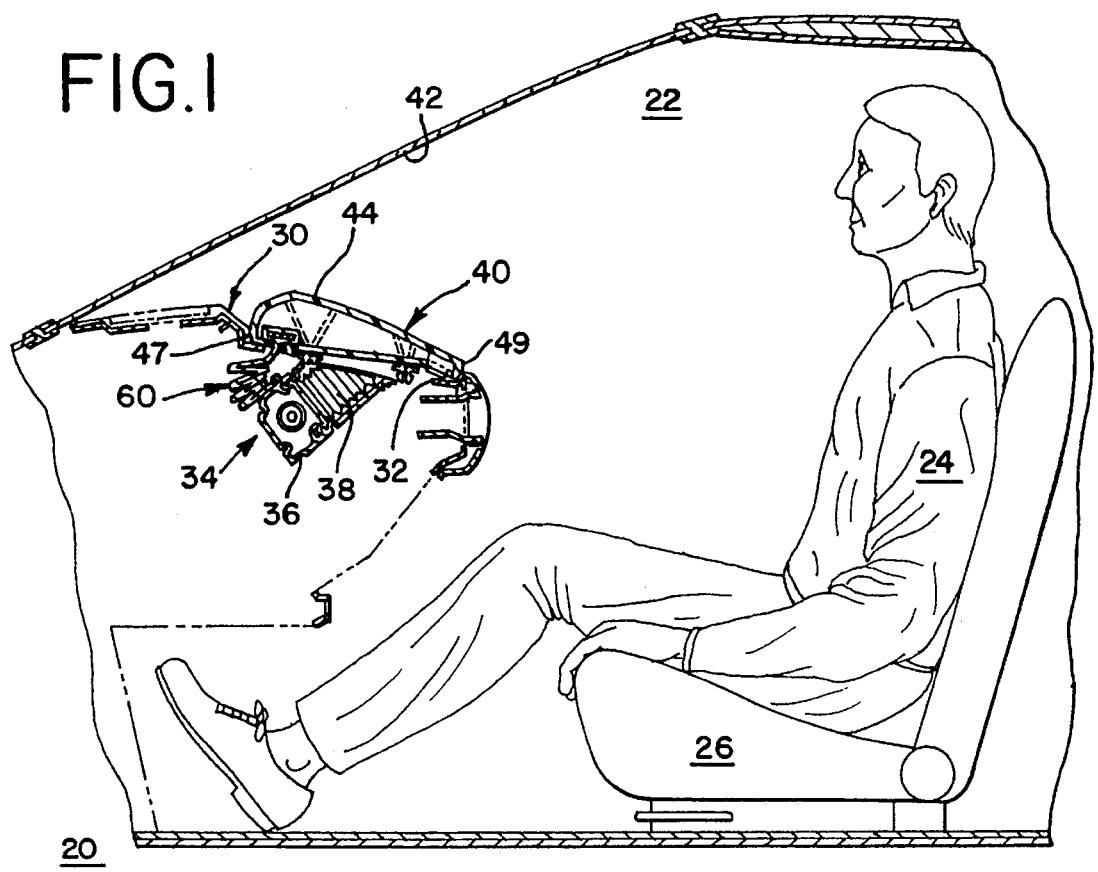
FIG. 1 is a longitudinal cross-sectional view of a motor vehicle illustrating a tethered cover airbag system in accordance with the present invention and shown with the cover in place on a panel opening while the bag is in deflated condition.
Figure 2:
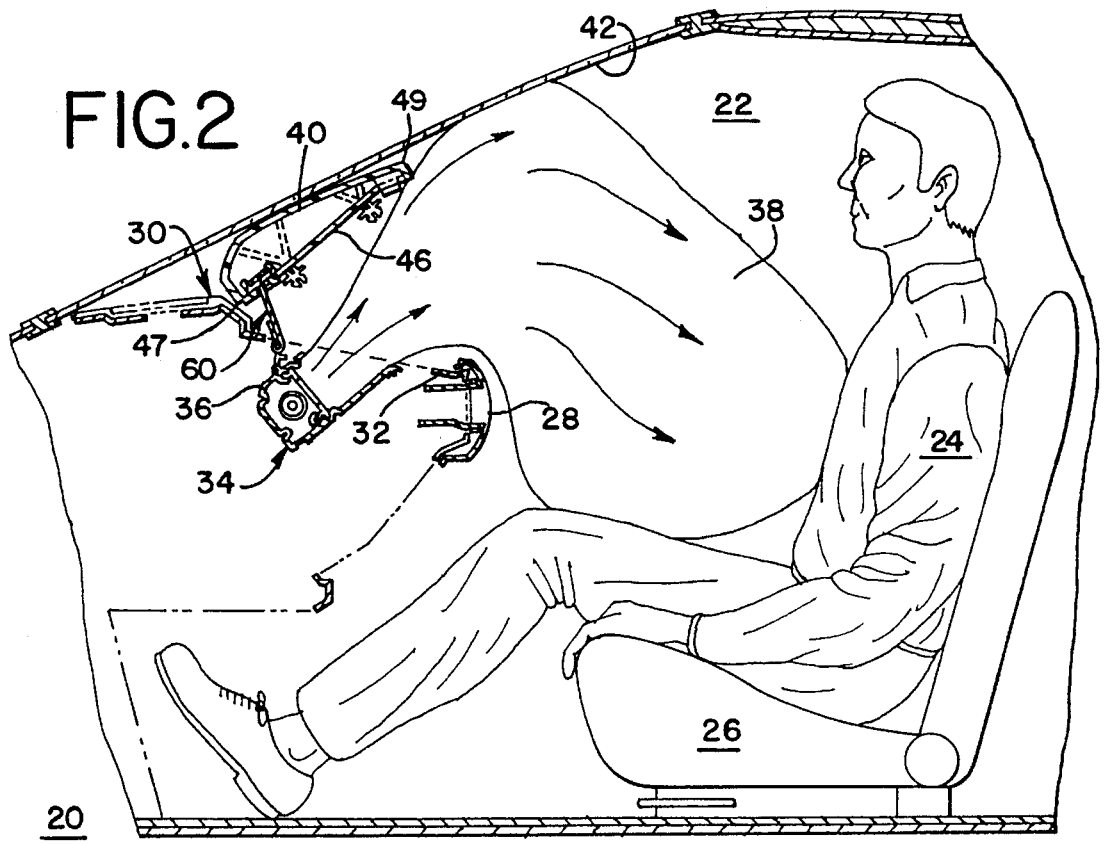
FIG. 2 is a longitudinal cross-sectional view similar to FIG. 1 but illustrating the airbag in a deployed position with the cover open but retained by the tether a limited distance away from the panel opening.

Referring now more particularly to the drawings, in FIGS. 1–2 is illustrated a motor vehicle 20 having a passenger compartment 22 for accommodating a person 24 in seated position on a vehicle seat 26. Forward of the occupant 24, the vehicle 20 includes a dashboard 28 and a panel 30 having an enlarged opening 32 spaced directly above an airbag and inflator assembly generally indicated by the reference numeral 34. The airbag and inflator assembly 34 includes a housing or canister 36 fixedly mounted in place beneath the panel 30 and the opening 32. An airbag 38 in deflated condition is stored and contained within the housing 36 until deployed as illustrated in FIG. 2 to protect the vehicle occupant 24 from injury in an accident.

Figure 4:
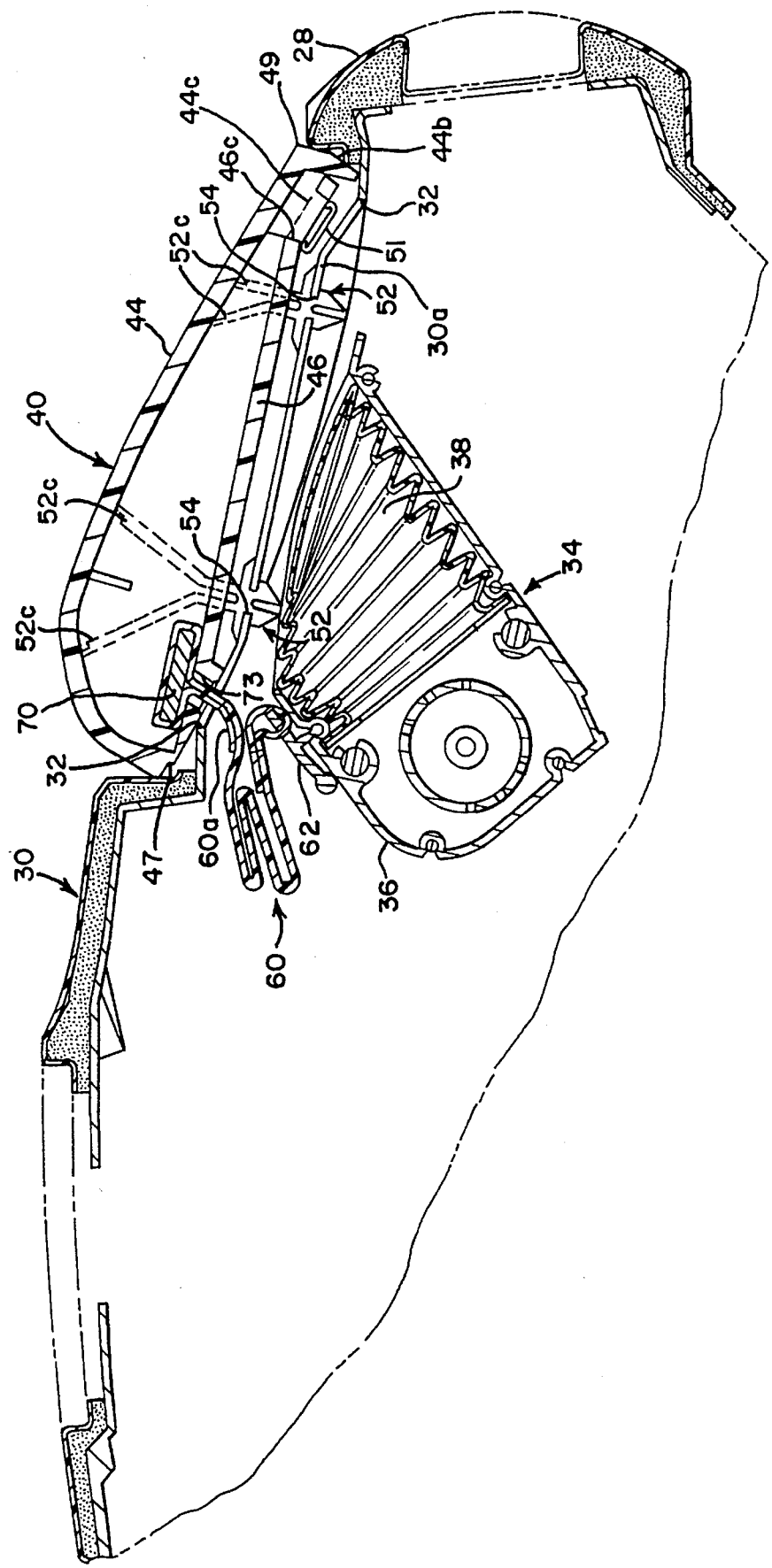
FIG. 4 is an enlarged, fragmentary cross-sectional view similar to that of FIG. 1 showing the cover in place closing the panel opening and the airbag in a deflated condition therebelow ready for deployment.

The panel opening 32 is normally closed by a movable cover 40, which as shown in FIGS. 1 and 4 forms part of the upper surface of the panel 30 above the opening 32. When the airbag 38 is inflated during a crash or emergency and expands outwardly, the cover 40 is rapidly moved away from the panel opening 32 permitting the expanding airbag to rapidly inflate as shown in FIG. 2. When airbag deployment occurs, the cover 40 if otherwise untethered or unrestrained could bounce off a windshield 42 or other interior surface in passenger compartment 22.

Figure 6:
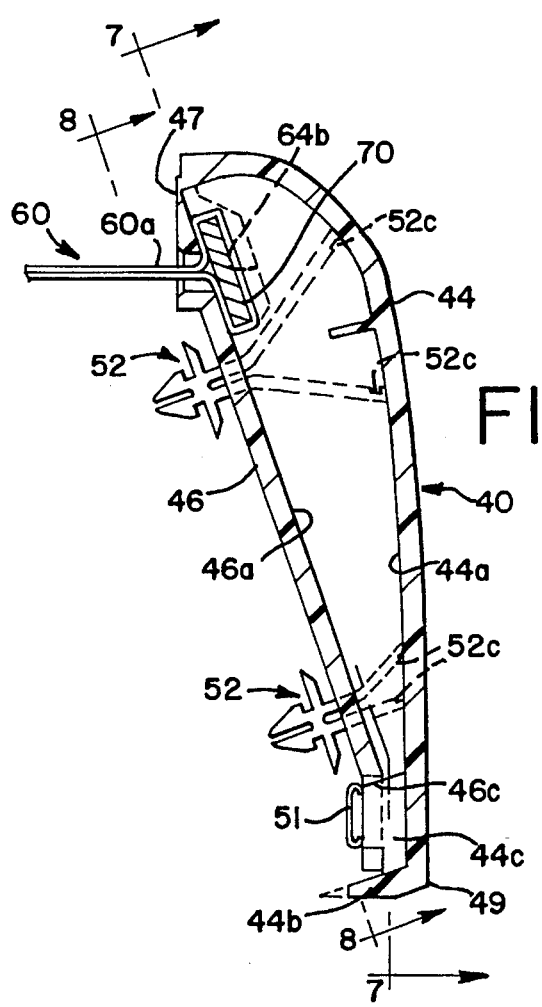
FIG. 6 is an enlarged, transverse cross-section of the tethered cover in accordance with the present invention illustrating the inner and outer skins in readiness for a heat staking operation.
Figure 7:
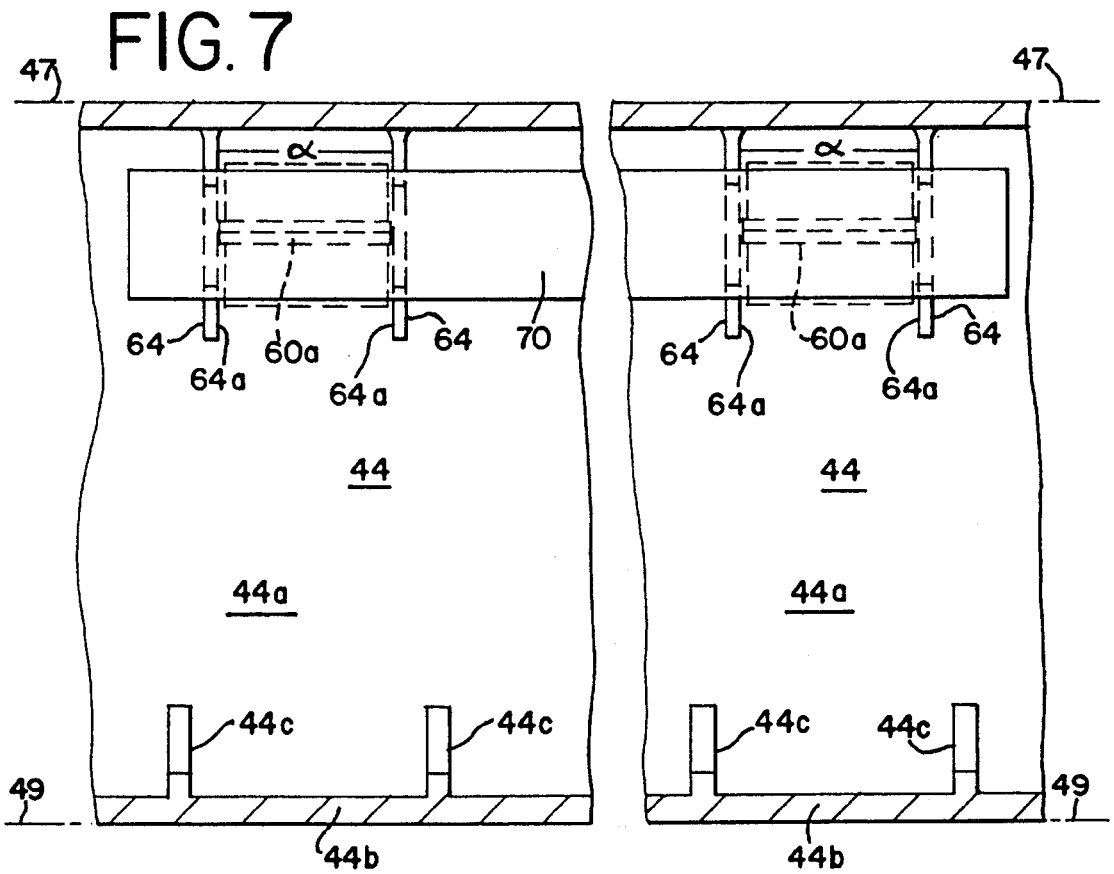
FIG. 7 is an underside view of the cover taken substantially along lines 7—7 of FIG. 6.

The cover 40 includes an outer skin 44 and an inner skin 46 integrally formed in a single piece and thereafter folded over along a forward edge 47 (FIG. 6). The integral skins 44 and 46 are constructed of molded resinous plastic material such as polypropylene to provide strength and integrity for the cover 40 as a whole so that break up or fracture of the cover into several pieces does not occur upon airbag deployment.

Figure 3:
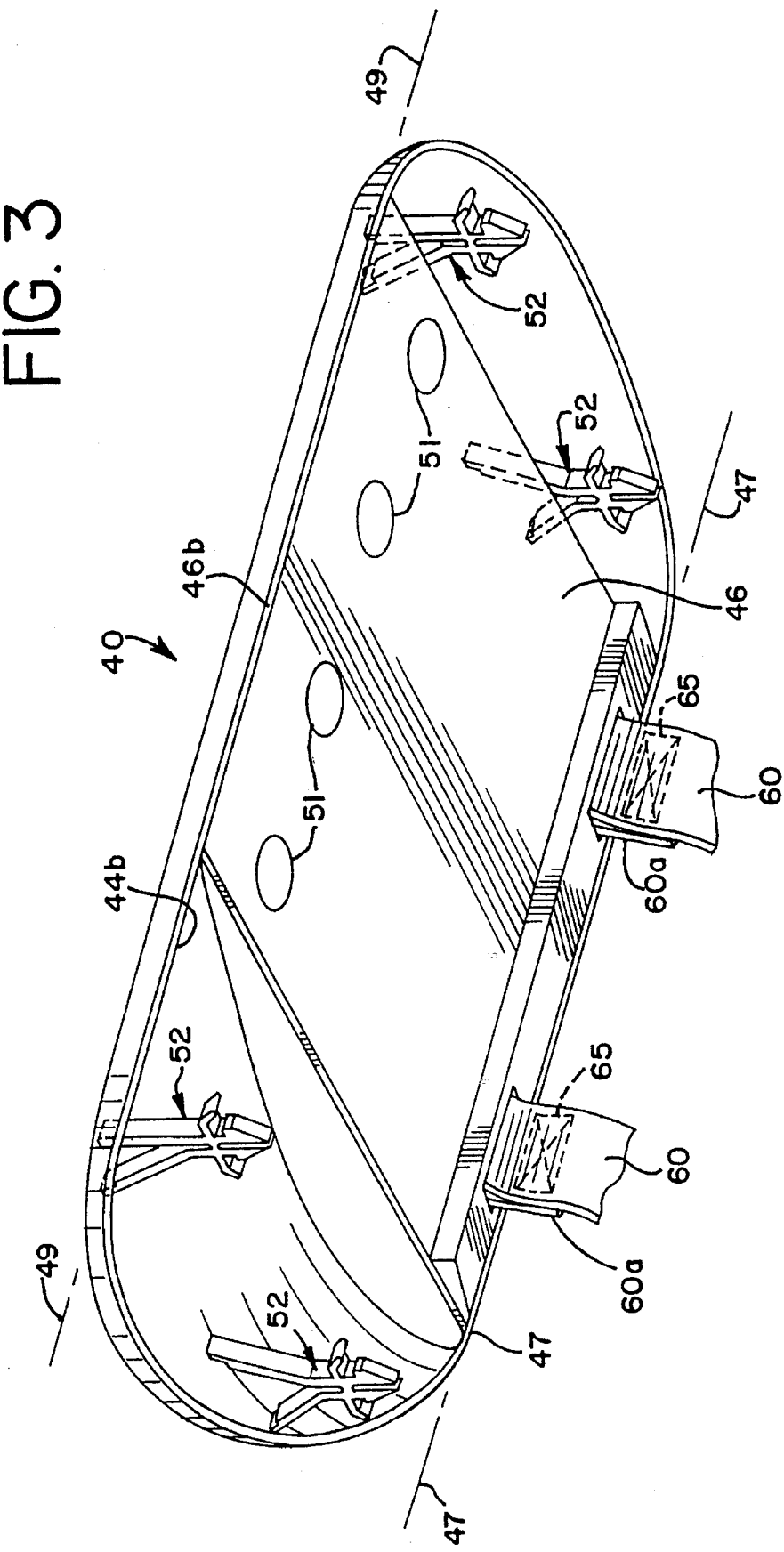
FIG. 3 is an underside view of a cover in accordance with the features of the present invention.

Normally the cover 40 is retained in a closed position (FIG. 1) directly above and over the panel opening 32 by a plurality of break-away fasteners 52 provided at opposite end portions of the cover (FIG. 3). Inner ends 52b of the fasteners 52 are inserted in and snap locked into apertures 54 (FIGS. 4 and 4A) provided in a lower flange 30a of the panel 30, at the opposite ends of the opening 32. Until the airbag 38 is deployed, the cover 40 acts as an integrated part of the panel 30 and at the same time protects the airbag assembly 34 from damage by limiting external access thereto.

At a position closely adjacent the inside surface of the outer skin 44, each leg 52a of a fastener 52 is notched as at 52c to provide a fracture line of reduced cross-section. When opening pressure from the inflating airbag 38 acts against the underside of the cover 40, the legs 52a of each latch element are readily fractured or broken at the notches 52c to release the cover 40 to move bodily away from the panel opening 32 from the closed position of FIG. 1 to the open position of FIG. 2.

In accordance with the present invention, one or more tethers 60 of strong, flexible material such as "Nylon" webbing, scrim material, web belting, or the like is interconnected between the underside of the cover 40 and the housing or canister 36 of the airbag inflator assembly 34. Inner ends of the flexible tethers 60 are interconnected to the upper sidewall of the canister 36 by means of metal or plastic clips 62 (FIG. 4).

Figure 5:
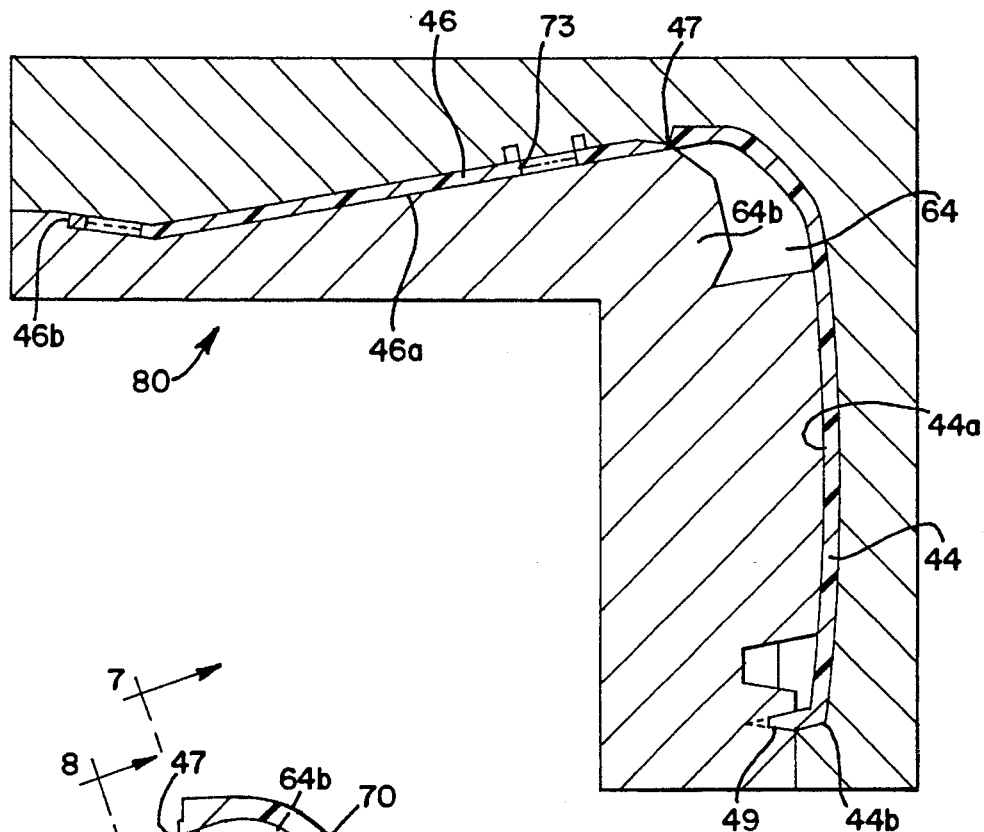
FIG. 5 is a transverse cross-sectional view through a mold utilized for molding an integral outer and inner skin of the cover in accordance with the present invention.

Referring now to FIGS. 5–8, the cover 40 including the integral inner and outer skins 46 and 44 is formed in a single mold 80 as shown in FIG. 5. After sufficient curing time, the molded resinous plastic piece is removed from the cavity of the mold 80 as a single piece or unitary member comprising both of the integrally molded skins 44 and 46. The respective inner and outer skins 46 and 44 are folded over on one another into an overlying relation as shown in FIG. 6 about a fold line 47 extending along and forming a forward edge of the cover 40.

In accordance with the invention, an inside face 44a of the outer skin 44 is molded to include one or more pairs of spaced apart positioning ribs 64 which are normal to the inside face and which extend toward a facing portion of an inside face 46a of the folded over inner skin 46. Each pair of positioning ribs 64 is spaced apart by a distance "d" (FIG. 7) slightly greater than the width "w" (FIG. 6) of the tethers 60. Parallel facing surfaces of each pair of ribs 64 form guide surfaces 64a for facilitating the passage of looped, outer end portions 60a of the tethers 60 (FIG. 6) around an elongated anchor bar 70 formed of a metal strip or strip of stiff, strong plastic material for spreading loads exerted by the tethers 60 over a wide area extending generally parallel of the fold line 47 for a substantial portion of the length of the cover 40.

Figure 8:
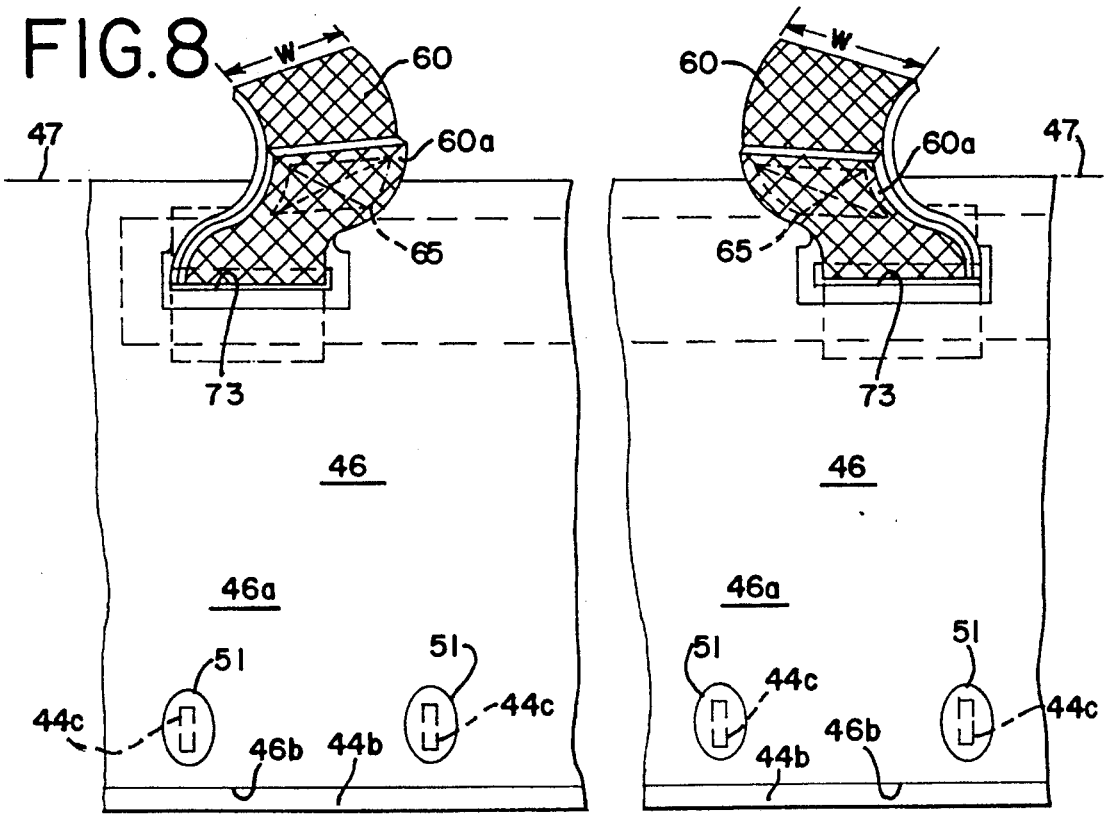
FIG. 8 is an underside view of the tethered cover taken substantially along lines 8—8 of FIG. 6.

Outer edges of the ribs 64 are formed with recess 64b of trapezoidal shape (FIGS. 5 and 6) for positioning the anchor bar 70 parallel relative to the fold line 47 and substantially close to or flush with the adjacent inside surface 46a of the folded over inner skin 46. The inner skin 46 is formed with slots 73 (FIGS. 6 and 8) aligned with the center line of anchor bar 70 in order to permit the looped outer end portions 60a of the tethers 60 to pass out through the inner skin 46 and extend toward the airbag housing 36. As shown in FIG. 8, a bitter end of each tether 60 is stitched as at 65 or otherwise permanently fastened to the body of the tether.

Along an edge 49 of the cover 40 facing toward the passenger 24 and opposite the fold line 47, the outer skin 44 is formed with a downturned edge flange 44b against which an edge 46b of the inner skin 46 abuts when the inner and outer skins are folded over ready for joining together along a rearward edge portion of the cover 40.

Joinder of the rearward edge portions of the inner and outer skins 44 and 46 is accomplished in a heat staking operation. Heat stakes 44c are integrally molded on the inside surface 44a of the outer skin 44 and are positioned at spaced apart intervals in a row adjacent and inwardly of the edge 46b. The inner skin 46 is formed with appropriately positioned slots 46c to receive the heat stakes 44c and outer ends of the heat stakes are spread and deformed as caps 51 in a heat staking operation to secure the inner and outer skins 46 and 44 together along a rearward edge portion of the cover 40.

The cover tether combination of the present invention provides for spreading the restraining load exerted by the tethers 60 on the cover 40 over a substantially large area thereon by means of the internal anchor bar 70 placed between the inner and outer skins 46 and 44. The one piece, integrally formed folded over resinous plastic inner and outer skins 46 and 44 provide an exceedingly strong cover structure and the anchor bar 70 serves as further internal reinforcement which reduces stress and minimizes the chances of severance of the cover 40 from the tethers 60 or break up or fracture of the cover into pieces.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. An airbag system for motor vehicles and the like, including an inflatable airbag contained in a housing while in a deflated condition, said housing having an open end for permitting said airbag to pass outwardly when inflatably deployed to provide cushioning support for an occupant of a vehicle seat, comprising:

cover means normally closing a panel opening formed in a panel in said vehicle adjacent said open end of said housing for protecting said airbag, said cover means movable to uncover said opening during deployment of said airbag;

flexible tether means interconnected between said cover means and at least one of said panel and said housing for limiting the movement of said cover means away from said panel upon inflatable deployment of said airbag;

said cover means including an integral outer and an inner skin folded over along an edge portion, said inner skin having slot means formed to permit passage of said tether means into a space formed between said skins, said outer skin of said cover means being formed with one or more support members extended toward said inner skin in said space; and anchor means in said space engaging said tether means for securing said tether means to said cover means and engaged by said one or more support members for positioning said anchor means in said cover means.

2. The airbag system of claim 1, wherein:

said anchor means is formed of stiff material extending beyond said slot means for spreading the load exerted by said tether means over a large area of said inner skin of said cover means upon deployment of said airbag.

3. The airbag system of claim 2, wherein:

said tether means includes a first portion wrapped around said anchor means.

4. The airbag system of claim 1, wherein:

said inner and outer skins are integrally molded together in a unitary piece and thereafter folded over along a fold line extending along an edge of said cover means.

5. The airbag system of claim 4, wherein:

said inner and outer skins are also interconnected adjacent an opposite edge portion of said cover means spaced opposite said fold line.

6. The airbag system of claim 5, wherein:

said inner and outer skins are interconnected by heat staking along said opposite edge portion of said cover means.

7. The airbag system of claim 6, wherein:

said outer skin is formed with at least one integral heat stake extending toward said inner skin and said inner skin is formed with a hole to receive said heat stake.

8. The airbag system of claim 7, wherein:

said outer skin has a plurality of said heat stakes spaced apart along said opposite edge portion of said cover means and said inner skin has a plurality of matching holes for receiving respective ones of said heat stakes.

9. The airbag system of claim 7, wherein:

said heat stake is deformed by heat, ultrasonics or other means at an outer end portion to bear against an outside face of said inner skin to secure said inner and outer skins together along said opposite edge portion of said cover means.

10. A tethered cover for a panel opening aligned with an airbag inflator housing, comprising:

cover means normally closing said panel opening for protecting said airbag in said housing, said cover means including an integrally formed inner and outer skin of molded resinous plastic material folded over to form a space between facing portions of said skins;

flexible tether means interconnected between said cover means and said panel or inflator housing having an outer end portion extending into said space between said skins; and elongated anchor means extending across a substantial portion of said cover means mounted between said inner and outer skin and attached to said tether means for distributing forces exerted by said tether means on said cover means during airbag deployment over a substantial portion of said cover means to reduce stress thereon.

11. The tethered cover of claim 10, wherein:

said inner and outer skins are joined together by heat stakes along a second area of said cover means spaced apart from said first edge.

12. The tethered cover of claim 11, wherein:

said heat stakes are formed on said outer skin and projected through openings on said inner skin for heading against said inner skin in a heat staking operation.

13. The tethered cover of claim 12, including:

a plurality of said heat stakes at spaced intervals along a line parallel of said elongated anchor means.

14. The tethered cover of claim 10, wherein:

said facing portions of said inner and outer skins are spaced apart by a substantial distance between edges of said cover means.

15. The tethered cover of claim 10, including:

internal positioning means in said space between said facing portions of said inner and outer skins for holding said anchor means in place extended along said one edge of said cover means.

16. The tethered cover of claim 15, wherein:

said inner skin is formed with slot means for passage of said outer end portion of said tether means into said space between facing portions of said skins for interconnection to said anchor means.

17. The tethered cover of claim 16, wherein:

said positioning means includes surfaces for guiding said tether means so that said outer end portion is looped around said anchor means.

18. The tethered cover of claim 17, wherein:

said positioning means includes at least one pair of ribs integrally formed on one of said skins to extend toward a facing surface of the other and spaced on opposite sides of said outer end portion of said tether means looped around said anchor means.

19. The tethered cover of claim 18, wherein:

said ribs are positioned at opposite ends of said slot means on said inner skin.

20. An airbag system for motor vehicles and the like, including an inflatable airbag contained in a housing while in a deflated condition, said housing having an open end for permitting said airbag to pass outwardly when inflatably deployed to provide cushioning support for an occupant of a vehicle seat, comprising:

cover means normally closing a panel opening formed in a panel in said vehicle adjacent said open end of said housing for protecting said airbag, said cover means movable to uncover said opening during deployment of said airbag;

flexible tether means interconnected between said cover means and at least one of said panel and said housing for limiting the movement of said cover means away from said panel upon inflatable deployment of said airbag;

said cover means including an integral outer and an inner skin folded over along an edge portion, said inner skin having slot means formed to permit passage of said tether means into a space formed between said skins;

said inner and outer skins being integrally molded together in a unitary piece and folded over along a fold line extending along an edge of said cover means, and also interconnected by heat staking adjacent an opposite edge portion of said cover means spaced opposite said fold line, said outer skin including at least one integral heat stake extending toward a hole formed in said inner skin for receiving said heat stake; and anchor means in said space engaging said tether means for securing said tether means to said cover means and engaged by support members for positioning said anchor means in said cover means.

21. The airbag system of claim 20, wherein:

said outer skin has a plurality of heat stakes spaced apart along said opposite edge portion of said cover means and said inner skin has a plurality of matching holes for receiving respective ones of said heat stakes.

22. The airbag system of claim 20, wherein:

said heat stake is deformed by heat, ultrasonics or other means at an outer end portion to bear against an outside face of said inner skin to secure said inner and outer skins together along said opposite edge portion of said cover means.

* * * * *